US012420765B2

(12) United States Patent
Han

(10) Patent No.: US 12,420,765 B2
(45) Date of Patent: Sep. 23, 2025

(54) DEVICE FOR MOVING BRAKE PEDAL

(71) Applicant: HL MANDO CORPORATION, Pyeongtaek-si (KR)

(72) Inventor: Sang-soo Han, Yongin-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 412 days.

(21) Appl. No.: 17/802,074

(22) PCT Filed: Feb. 25, 2021

(86) PCT No.: PCT/KR2021/002402
§ 371 (c)(1),
(2) Date: Aug. 24, 2022

(87) PCT Pub. No.: WO2021/172906
PCT Pub. Date: Sep. 2, 2021

(65) Prior Publication Data
US 2023/0093208 A1    Mar. 23, 2023

(30) Foreign Application Priority Data
Feb. 25, 2020  (KR) .......................... 10-2020-0022677

(51) Int. Cl.
*B60T 13/00*    (2006.01)
*B60T 7/04*    (2006.01)
(Continued)

(52) U.S. Cl.
CPC .............. *B60T 13/745* (2013.01); *B60T 7/04* (2013.01); *B60T 8/172* (2013.01); *B60T 8/4086* (2013.01);
(Continued)

(58) Field of Classification Search
CPC .......... B60T 7/04; B60T 8/4086; B60T 8/409; B60T 13/741; B60T 13/746; F16H 1/06
See application file for complete search history.

(56) References Cited

U.S. PATENT DOCUMENTS 4,918,921 A * 4/1990 Leigh-Monstevens ......................
F16D 48/04
74/388 R
5,094,079 A * 3/1992 Leigh-Monstevens ......................
B60T 13/66
60/545

(Continued)

FOREIGN PATENT DOCUMENTS

CN        105156520 A    12/2015
JP        2012-81799 A    4/2012
(Continued)

OTHER PUBLICATIONS

Machine translation of CN 10515620 (no date).*
(Continued)

*Primary Examiner* — Nicholas J Lane
(74) *Attorney, Agent, or Firm* — Harvest IP Law, LLP

(57) ABSTRACT

Disclosed is a device for moving a brake pedal. The device for moving a brake pedal according to the present embodiment comprises: a lead screw fixed to an input rod of the brake pedal and having a first screw thread formed on the outer circumferential surface thereof; a first anti-rotation unit that prevents rotation of the lead screw; an actuator that provides power; a rotator rotated by the actuator; and a nut that rotates together with the rotator and is provided to be slidably movable with respect to the rotator, and that has a second screw thread formed on the inner circumferential surface thereof for meshing with the first screw thread.

18 Claims, 6 Drawing Sheets

(51) Int. Cl.
  *B60T 8/172* (2006.01)
  *B60T 8/40* (2006.01)
  *B60T 13/74* (2006.01)
  *F16H 1/06* (2006.01)

(52) U.S. Cl.
  CPC ............ *B60T 8/409* (2013.01); *B60T 13/741* (2013.01); *B60T 13/746* (2013.01); *F16H 1/06* (2013.01); *B60Y 2400/81* (2013.01)

(56) References Cited

U.S. PATENT DOCUMENTS

| | | | |
|---|---|---|---|
| 2003/0024245 A1* | 2/2003 | Fulks | B60T 13/745 60/545 |
| 2005/0252734 A1* | 11/2005 | Giering | B60T 13/745 188/72.8 |
| 2006/0037426 A1* | 2/2006 | Teller | G05G 1/405 74/512 |
| 2010/0242469 A1* | 9/2010 | Jungbecker | B60T 13/745 60/594 |
| 2011/0074209 A1* | 3/2011 | Ueno | B60T 13/745 303/20 |
| 2012/0144823 A1* | 6/2012 | Usui | B60T 13/745 60/545 |
| 2017/0158181 A1* | 6/2017 | Jiang | B60T 13/741 |
| 2018/0170328 A1* | 6/2018 | Yoshizu | B60T 7/042 |
| 2018/0244175 A1 | 8/2018 | Tan | |
| 2019/0100172 A1* | 4/2019 | Lee | B60T 7/042 |
| 2022/0169225 A1* | 6/2022 | Hong | G01D 5/12 |
| 2023/0086406 A1* | 3/2023 | Lee | B60T 7/12 74/514 |

FOREIGN PATENT DOCUMENTS

| | | |
|---|---|---|
| KR | 10-2010-0103518 A | 9/2010 |
| KR | 10-2018-0068599 A | 6/2018 |

OTHER PUBLICATIONS

International Search Report (PCT/ISA/210) issued in PCT Application No. PCT/KR2021/002402 dated Jun. 8, 2021 with English Translation.
Written Opinion (PCT/ISA/237) issued in PCT Application No. PCT/KR2021/002402 dated Jun. 8, 2021.
KR Office Action Dated Apr. 26, 2025.

\* cited by examiner

[Fig. 1]
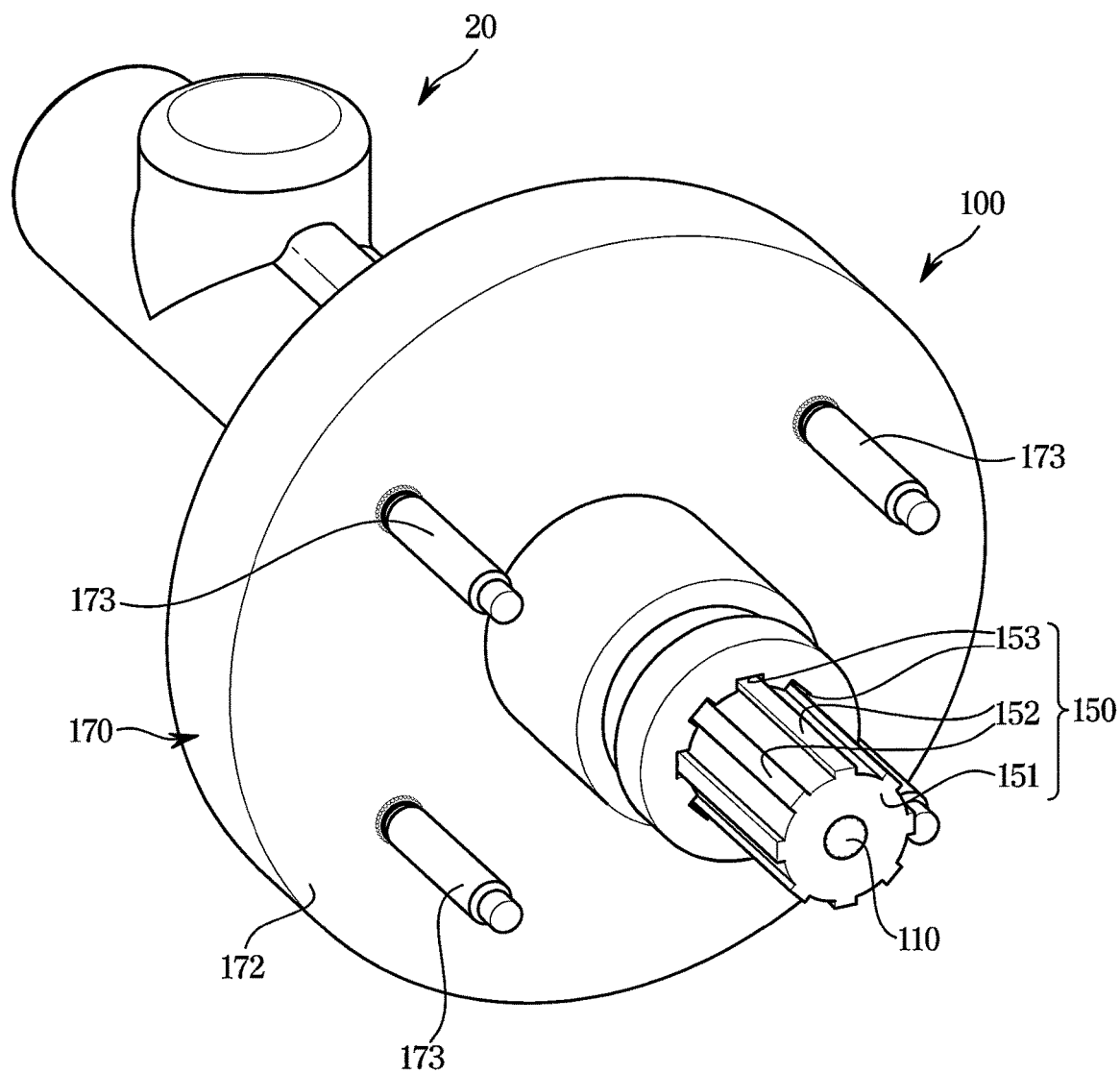

[Fig. 2]
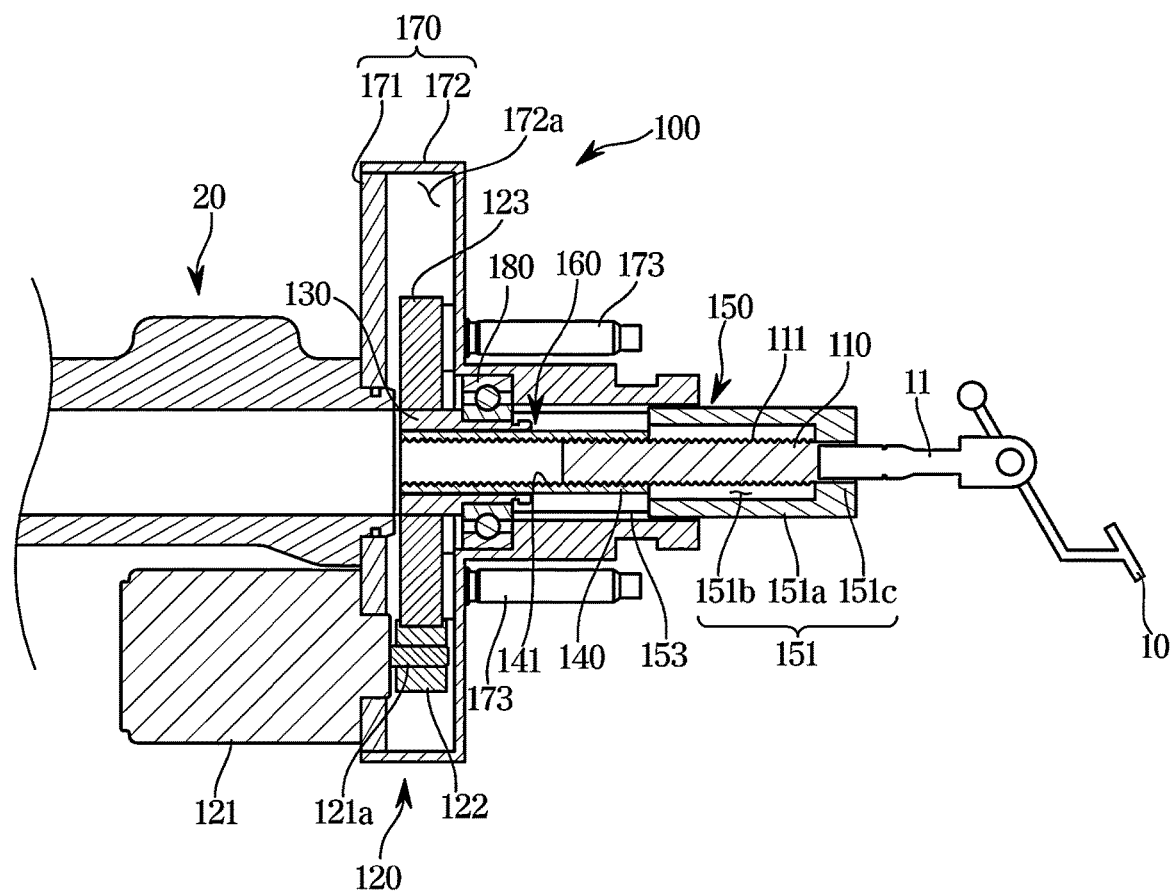

[Fig. 3]
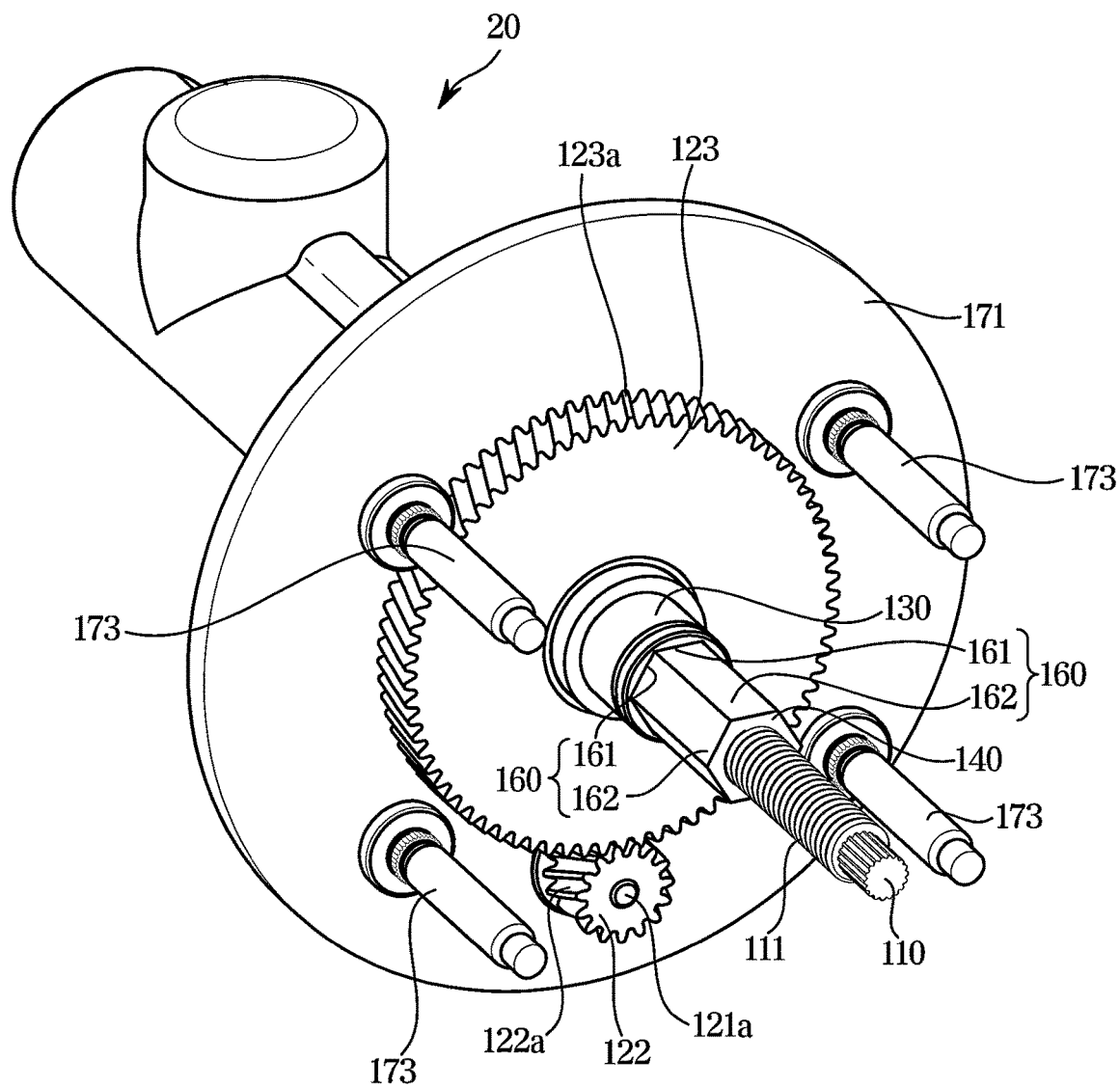

[Fig. 4]
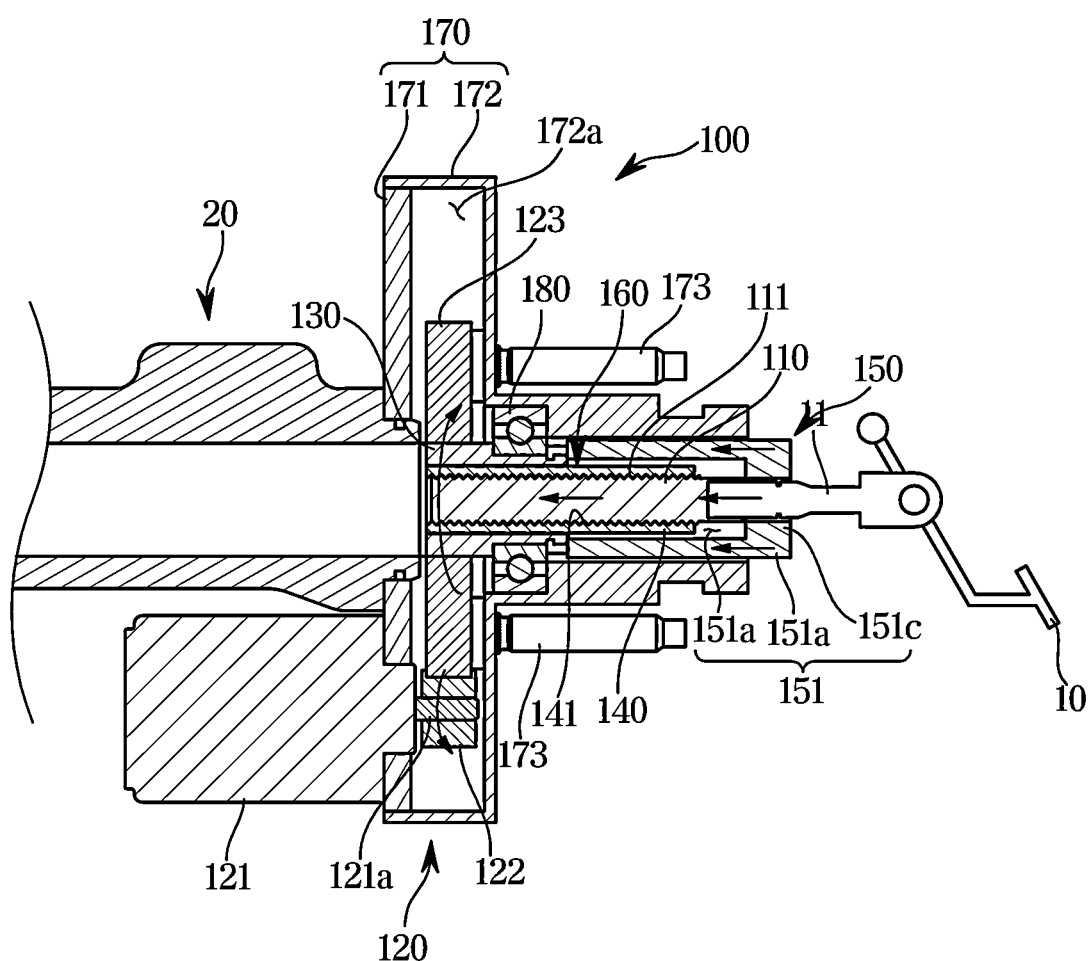

[Fig. 5]
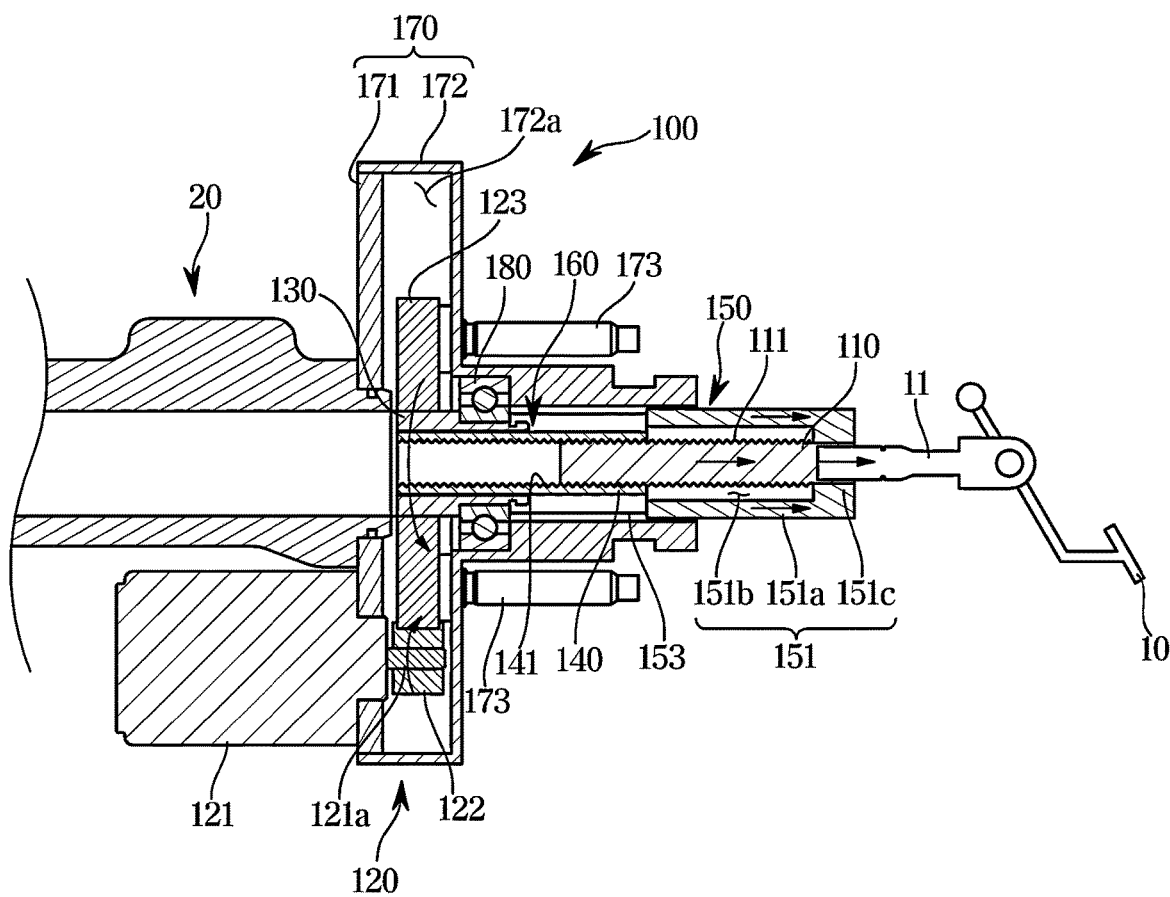

[Fig. 6]
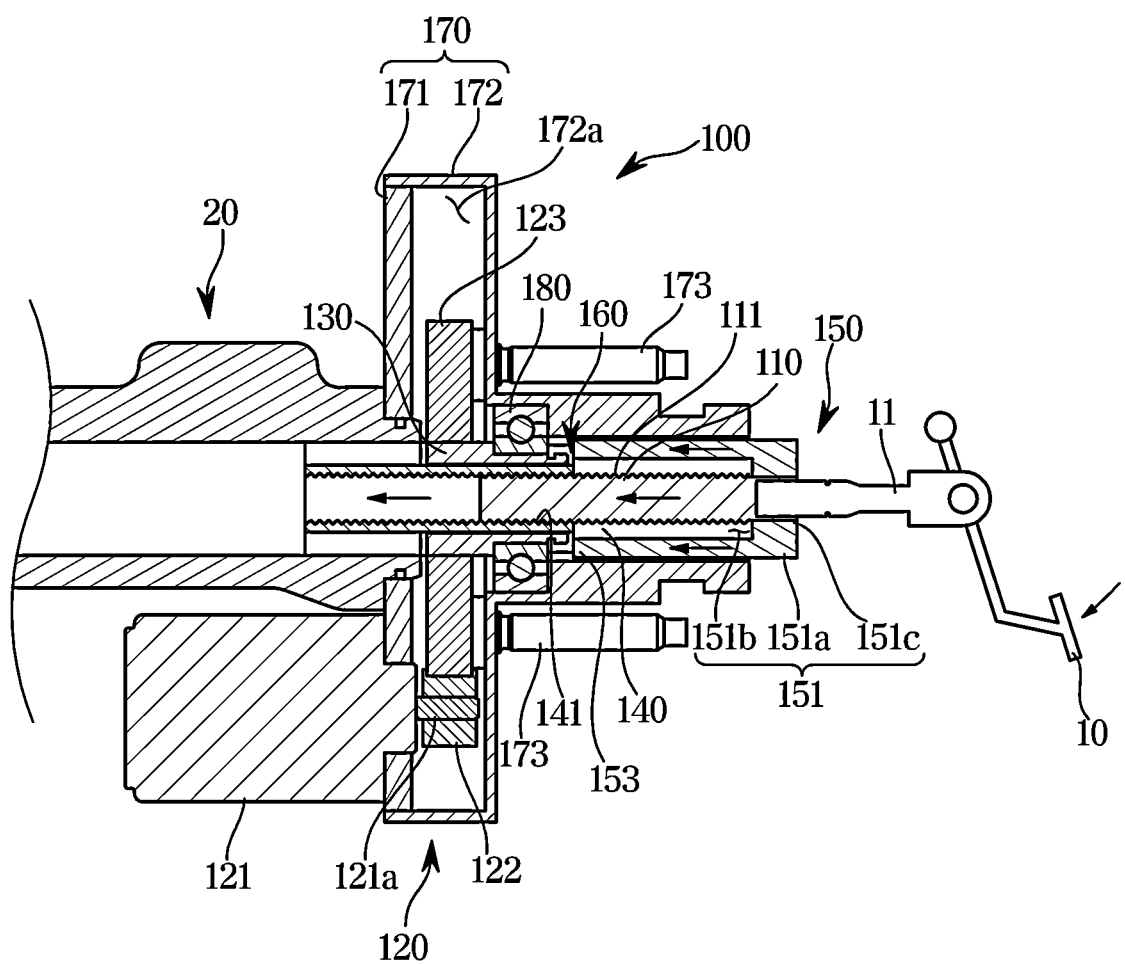

DEVICE FOR MOVING BRAKE PEDAL

CROSS-REFERENCE OF RELATED APPLICATIONS

This application is the U.S. National Phase under 35 U.S.C. § 371 of International Patent Application No. PCT/KR2021/002402, filed on Feb. 25, 2021, which claims the benefit of Korean Patent Application No. 10-2020-0022677, filed on Feb. 25, 2020, the entire disclosures of each are incorporated by reference herein.

TECHNICAL FIELD

The present disclosure relates to a device for moving a brake pedal, and more specifically, to a device for moving a brake pedal capable of moving a brake pedal forward and backward according to an operating condition of a vehicle.

BACKGROUND ART

Vehicles are essentially equipped with a brake system for performing braking, and various types of brake systems have been proposed for the safety of drivers and passengers.

In the conventional brake system, a method of supplying a hydraulic pressure required for braking to wheel cylinders using a mechanically connected booster when a driver depresses a brake pedal has been mainly used. In addition, with a demand for implementing various braking functions to actively cope with operating environments of vehicles, electronic brake systems have recently been developed to, upon application of a brake pedal, receive an electrical signal corresponding to a braking intention of the driver from a pedal displacement sensor that detects a displacement of the brake pedal, and operate a hydraulic pressure supply device based on the electric signal to supply a hydraulic pressure required for braking to wheel cylinders.

In such a brake system, braking of the vehicle is directly or indirectly controlled according to a brake pedal effort by the driver, so the brake pedal needs to remain exposed toward the driver in a passenger space of the vehicle for the driver to perform the pedal manipulation at any time.

On the other hand, there has been recent development of autonomous driving systems in which a vehicle recognizes surrounding information from a camera, radar, sensor or the like mounted on the vehicle, and based on the information, autonomously travel and stops without an intervention of a driver. During autonomous travel of a vehicle, the travel is automatically performed based on the detected information regardless of whether the driver manipulates the brake pedal, and in this case, a brake pedal that remains exposed toward the passenger space of the vehicle may not only interfere with the driver's living comfort, but also have a risk of injury to the leg of the driver in the event of a collision accident during autonomous travel.

DISCLOSURE

Technical Problem

The embodiment is directed to providing a device for moving a brake pedal that is capable of adjusting the position of a brake pedal according to an operating situation of a vehicle.

The embodiment is directed to providing a device for moving a brake pedal that is capable of improving a driver's living comfort by retracting a brake pedal during autonomous driving of a vehicle.

The embodiment is directed to providing a device for moving a brake pedal that is capable of improving manipulability of a vehicle by exposing a brake pedal toward the driver during general driving of the vehicle.

The embodiment is directed to providing a device for moving a brake pedal that is capable of easily implementing forward and backward movement of a brake pedal with a simple structure.

The embodiment is directed to providing a device for moving a brake pedal that is capable of minimizing an injury to a driver in the event of a vehicle accident.

Technical Solution

One aspect of the disclosure provides an apparatus for moving a brake pedal, the apparatus including: a lead screw fixed to an input rod of a brake pedal and having a first screw thread formed on an outer circumferential surface thereof; a first anti-rotator that prevents the lead screw from rotating; an actuator that provides power; a rotator rotated by the actuator; and a nut that rotates together with the rotator and is provided to be slidably movable with respect to the rotator and that has a second screw thread formed on an inner circumferential surface thereof to mesh with the first screw thread.

The apparatus may further a second anti-rotator that prevents the rotator and the nut from rotating relative to each other.

The first anti-rotator may include: an anti-rotation body fixed to the lead screw; at least one anti-rotation protrusion protruding from the anti-rotation body; and at least one anti-rotation groove recessed in a fixedly installed structure and allowing the anti-rotation protrusion to be inserted thereinto.

The anti-rotation body may include a body part provided in a cylindrical shape, and the anti-rotation protrusion may be provided on an outer circumferential surface of the body part.

The anti-rotation body may include a hollow part formed inside the body part to accommodate at least a portion of the lead screw, and into which the nut is insertable.

The apparatus may further include a housing having an accommodation space at an inside thereof, wherein the housing may include: a panel fixed to a dash panel and having a rear side on which a master cylinder is disposed; and a cover that forms the accommodation space and extends toward the brake pedal, to be coupled to a front side of the panel.

The anti-rotation groove may be formed by recessing the cover.

The anti-rotation body may be provided in a cylindrical shape and provided to pass through a through hole that passes through the cover, and the anti-rotation protrusion may be provided on an outer circumferential surface of the anti-rotation body, and the anti-rotation groove may be provided on an inner circumferential surface of the through hole.

The apparatus may further include a bearing interposed between the rotator and the housing.

The actuator may include: a motor that generates power; and a gear assembly provided between a drive shaft of the motor and the rotator.

The motor may be disposed on the rear side of the panel.

The gear assembly may be disposed on the front side of the panel and provided in the accommodation space.

The second anti-rotator may include: at least one first plane formed on an inner circumferential surface of the rotator; and at least one second plane formed on an outer circumferential surface of the nut to be in contact with the first plane.

The gear assembly may include: a first gear coupled to the drive shaft of the motor; and a second gear provided between the first gear and the rotator to transmit power transmitted from the first gear to the rotator.

The first gear may be provided with first gear teeth on an outer circumferential surface thereof, and the second gear may be provided with second gear teeth meshing with the first gear teeth on an outer circumferential surface thereof.

A rotation shaft of the first gear and a rotation shaft of the second gear may be arranged in parallel to each other.

The housing may further include a fixing pin that couples the panel and the cover to each other and allows the housing to be supported on a vehicle body.

The nut may be provided to be in contact with a piston of the master cylinder.

The anti-rotator may further include a fastening part fixed to the lead screw.

The actuator may be controlled to automatically operate by an electronic control unit of a vehicle, or controlled to operate by receiving an operation signal from a driver.

Advantageous Effects

The device for moving a brake pedal according to the present embodiment can effectively adjust the position of a brake pedal according to an operating situation of a vehicle.

The device for moving a brake pedal according to the present embodiment can improve a driver's living comfort by retracting a brake pedal during autonomous driving of a vehicle.

The device for moving a brake pedal according to the present embodiment can improve the manipulability of the vehicle by exposing a brake pedal toward the driver during general driving of the vehicle.

The device for moving a brake pedal according to the present embodiment can easily implement forward and backward movement of a brake pedal with a simple structure.

The device for moving a brake pedal according to the present embodiment can minimize an injury to a driver in the event of a vehicle accident.

DESCRIPTION OF DRAWINGS

FIG. 1 is a perspective view illustrating a state in which a device for moving a brake pedal according to the present embodiment is mounted on a master cylinder.

FIG. 2 is a side sectional view illustrating the device for moving the brake pedal according to the present embodiment.

FIG. 3 is a perspective view illustrating a state in which a cover of the device for moving the brake pedal according to the present embodiment is removed.

FIG. 4 is a side sectional view illustrating a state in which a brake pedal is retracted from a passenger space by the device for moving the brake pedal (an advancing state).

FIG. 5 is a side sectional view illustrating a state in which a brake pedal is exposed to a passenger space by the device for moving the brake pedal (a retreating state).

FIG. 6 is a side sectional view illustrating a state in which a brake pedal exposed to the passenger space by the device for moving the brake pedal operates.

MODE OF THE DISCLOSURE

Hereinafter, embodiments of the present disclosure will be described in detail with reference to the accompanying drawings. The following examples are presented to sufficiently convey the spirit of the present disclosure to those of ordinary skill in the art to which the present disclosure pertains. The present disclosure is not limited to the embodiments presented herein and may be embodied in other forms. The drawings may omit the illustration of parts irrelevant to the description in order to clarify the present disclosure, and may slightly exaggerate the size of the components to help understanding.

FIG. 1 is a perspective view illustrating a state in which a device 100 for moving a brake pedal according to the present embodiment is mounted on a master cylinder 20, and FIG. 2 is a side sectional view illustrating a state in which a device 100 for moving a brake pedal according to the present embodiment is mounted on a master cylinder 20. In addition, FIG. 3 is a perspective view illustrating a state in which a cover 172 of the device 100 for moving the brake pedal according to the present embodiment is removed.

The device 100 for moving a brake pedal according to the present embodiment may move a brake pedal 10 according to the operating conditions of a vehicle so that the driver's living comfort and the manipulability of the vehicle may be improved. Specifically, when the vehicle autonomously travels, braking of the vehicle is automatically implemented, so the driver's manipulation of the brake pedal 10 is not required. Therefore, in order to provide the driver with a comfortable habitability, the device 100 for moving a brake pedal according to the present embodiment may move the brake pedal 10 forward (leftward in FIG. 2) from the passenger space of the vehicle so that the brake pedal 10 is retracted. On the contrary, when the vehicle is driven and braked by the driver, in order that the driver easily manipulates the brake pedal 10, the device 100 for moving a brake pedal according to the present embodiment may move the brake pedal 10 backward (rightward in FIG. 2) so that the brake pedal 10 is exposed to the passenger space of the vehicle. In addition, since the position at which the manipulation of the brake pedal 10 is facilitated may be different for each body size of the driver, and the driver's living comfort may also be required even when the vehicle is stopped, the device 100 for moving a brake pedal according to the present embodiment may adjust the brake pedal 10 to a suitable position.

Referring to FIGS. 1 to 3, the device 100 for moving a brake pedal according to the present embodiment may include a lead screw 110 fixed to an input rod 11 of the brake pedal 10, a first anti-rotator 150 for preventing the lead screw 110 from rotating, an actuator 120 for providing power for movement of the brake pedal 10, a rotator 130 rotating by receiving power from the actuator 120, a nut 140 rotating together with the rotator 130 and provided to be slidably movable with respect to the rotator 130 and screwed to the lead screw 110, a second anti-rotator 160 for preventing relative rotation between the rotator 130 and the nut 140, a housing 170 accommodating components therein, and a bearing 180 for realizing smooth rotation of the rotator 130.

The brake pedal 10 may be disposed at a front lower side of a driver's seat in a passenger space of the vehicle. The brake pedal 10 may be rotatably connected to the input rod 11, and the input rod 11 may be provided to pass through a dash panel (not shown) that divides an engine room and the passenger space of the vehicle. The brake pedal 10 may generate a displacement in a master piston provided in the master cylinder 20 according to a driver's pedal effort, and for this, may be connected to the master cylinder 20 through the input rod 11 and the device 100 for moving a brake pedal. The master cylinder 20 and the brake pedal 10 may be disposed on the engine room side and the passenger space side, respectively, with respect to the dash panel. Although not shown in the drawings, a pedal displacement sensor that measures a displacement of the brake pedal 10 or the input rod 11 to transmit an electrical signal to an electronic control unit (ECU, not shown) may be provided.

The housing 170 may form the body of the device and have an accommodation space 172a in which various components to be described below are mounted and installed. The housing 170 may include a panel 171 fixed to the dash panel, a cover 172 having the accommodation space 172a for components and coupled to the panel 171, and a plurality of fixing pins 173 for coupling the panel 171 and the cover 172 to each other and allowing the housing 170 to be supported on a vehicle body, such as the dash panel.

The panel 171 may be formed in a plate shape, and may be fixedly installed on the dash panel. As described above, on the engine room side, which is a rear side (a left side in FIG. 2) of the panel 171, the master cylinder 20 and a motor 121 of the actuator 120 to be described below may be disposed, and on a front side (a right side in FIG. 2) of the panel 171, various gears and components to be described below may be disposed.

The cover 172 may have the accommodation space 172a formed as an empty space inside, and may extend toward the brake pedal 10 so that various components may be stably accommodated and mounted in the accommodation space 172a. The cover 172 may be coupled to a front surface of the panel 171 by the plurality of fixing pins 173. The cover 172 may be provided at an inner side thereof with a through hole through which the lead screw 110 and the first anti-rotator 150 to be described below may pass, and circumferential the through hole may be provided on an inner circumferential surface thereof with a plurality of anti-rotation grooves 153 of the first anti-rotator 150 formed as recesses. Details thereof will be described below.

The lead screw 110 may be provided to be fixed to the input rod 11, and have a first screw thread 111 formed on an outer circumferential surface thereof as a male screw thread (or a female screw thread). Specifically, the lead screw 110 may be formed in a cylindrical bar shape into which at least a portion of an end of a front side (the left side in FIG. 2) of the input rod 11 is inserted and fixed so that the lead screw 110 may operate as one body with the input rod 11, and the lead screw 110a may have the first screw thread 111 formed on the outer circumferential surface thereof and meshing with a second screw thread 141 of the nut 140 to be described below. The lead screw 110 may be prevented from rotating by the first anti-rotator 150 to be described below, and may perform forward and backward motions together with the input rod 11 according to a driver's manipulation of the brake pedal 10.

The first anti-rotator 150 may be provided to prevent the lead screw 110 from rotating. As will be described below, since rotation of the lead screw 110 is limited by the first anti-rotator 150, even when the nut 140 meshing with the lead screw 110 is rotated by the actuator 120, the rotational motion of the nut 140 may be converted into a translational motion of the lead screw 110 and the input rod 11 fixed to the lead screw 110.

The first anti-rotator 150 may include an anti-rotation body 151 fixed to the lead screw 110, and at least one rotation protrusion 152 protruding from the anti-rotation body 151 along the moving direction of the lead screw 110, and an at least one anti-rotation groove 153 formed as a recess in a fixedly installed structure and allowing the anti-rotation protrusion 152 to be inserted thereinto.

The anti-rotation body 151 may include a body part 151a formed in a cylindrical shape, a hollow part 151b formed inside the body part 151 as a hollow to accommodate at least a portion of the lead screw 110 and into which the nut 140 to be described below is insertable, and a coupling part 151c coupled to one end of the lead screw 110 to fix the lead screw 110 and the anti-rotation body 151 to each other.

The anti-rotation protrusion 152 may be formed on the outer circumferential surface of the body part 151a, and in order for the lead screw 110 to perform a translational motion without rotating, the anti-rotation protrusion 152 may be formed to protrude and extend along the movement direction of the lead screw 110, that is, the forward and backward movement directions of the input rod 11. The anti-rotation groove 153 may be recessed at a position facing the anti-rotation protrusion 152 in a structure fixedly installed on the vehicle body. Specifically, since the anti-rotation body 151 is provided to pass through the through hole of the cover 172, the anti-rotation groove 153 may be formed as a recess in the inner circumferential surface of the through hole of the cover 172 to correspond to the anti-rotation protrusion 152 protruding from the outer circumferential surface of the body part 151a. The anti-rotation protrusion 152 protruding from the body part 151a may be inserted into the anti-rotation groove 153 recessed in the through hole of the cover 172, whereby the lead screw 110 fixed to the anti-rotation body 151 may be prevented from being rotating while being allowed to perform a translation movement. The anti-rotation grooves 153 may be provided corresponding in number and shape to those of the anti-rotation protrusions 152. In the drawings, each of the anti-rotation protrusions 152 and the anti-rotation grooves 153 is illustrated as having a square cross-section and provided in eight units radially spaced apart from each other, but may be provided in various cross-sectional shapes and number without limitation.

The actuator 120 is provided to generate power for the movement of the brake pedal 10 and the input rod 11 and transmit the generated power. The actuator 120 may include a motor 121 that receives power from a vehicle battery (not shown) to generate power, and a gear assembly provided between a drive shaft 121a of the motor 121 and the rotator 130 to transmit power.

The motor 121 may be fixed to and supported on the panel 171, and may be disposed on the rear side of the panel 171 to improve the space utilization of the passenger space. The motor 121 may include the drive shaft 121a that outputs a rotational force, and may be provided as a bidirectional electric motor 121 that performs forward and reverse rotation to implement forward and backward movement of the brake pedal 10. The operation of the motor 121 may be automatically controlled according to an electrical signal transmitted from the electronic control unit. Alternatively, the operation of the motor 121 may be controlled according to an electrical signal, such as an operation signal transmitted by a driver's input.

The gear assembly may be disposed on the front side of the panel 171 and may be provided in the accommodation space 172a, and include a first gear 122 coupled to the drive shaft 121a of the motor 121 and a second gear 123 connected to the first gear 122 to receive power and coaxially rotating together with the rotator 130 to be described below.

The first gear 122 may be connected to the drive shaft 121a of the motor 121 to transmit rotational force or power output from the motor 121 to the second gear 123. The first gear 122 may have a first gear tooth 122a formed on the outer circumferential surface thereof, and the second gear 123 may have a second gear tooth 123a formed on the outer circumferential surface thereof and meshing with the first gear tooth 122a, so that power may be transmitted from the first gear 122 to the second gear 123. In addition, the first gear 122 may coaxially rotate together with the drive shaft 121a of the motor 121, and the second gear 123 may rotate together with the rotator 130 to be described below.

The rotation shaft of the first gear 122 and the rotation shaft of the second gear 123 may be provided parallel to each other. In other words, according to the shape of the first gear tooth 122a and the second gear tooth 123a, the first gear 122 and the second gear 123 may be provided as a spur gear or a helical gear to provide the rotator 130 with power received from the motor 121. In addition, the first gear 122 and the second gear 123 may decelerate the power transmitted from the motor 121 and transmit the decelerated power to the rotator 130. The drawings illustrate an example in which the first gear tooth 122a and the second gear tooth 123a are provided as a helical gear formed in an inclined shape, but this is only an example for aiding understanding of the disclosure, and the disclosure is not limited to the corresponding gear structure.

The rotator 130 may be fixedly provided at an inside of the second gear 123 to coaxially rotate together with the second gear 123. The rotator 130 may be fixedly provided in the center of the second gear 123, and may be formed to extend along the forward and backward movement directions of the brake pedal 10 so that interlocking with the nut 140 to be described below may be stably achieved. The rotator 130 may have an outer circumferential surface fixed while in contact with an inner circumferential surface of the second gear 123 and have an inner circumferential surface on which the nut 140 to be described below may be disposed such that the nut 140 may rotate together with the rotator 130 and may also be provided to be slidably movable.

The nut 140 may rotate together with the rotator 130 and may also be provided to be slidably movable with respect to the rotator 130, and the nut 140 may be provided on the inner circumferential surface thereof with the second thread 141 meshing with the first thread 111 of the lead screw 110. The nut 140 may have a front surface that is provided to be in direct or indirect contact with a piston (not shown) that pressurizes the master chamber of the master cylinder 20, so that a displacement may occur in the piston according to the forward and backward movement of the nut 140.

The nut 140 may be disposed on the inner circumferential surface of the rotator 130 to coaxially rotate together with the rotator 130, but relative rotation of the nut 140 with respect to the rotator 130 may be limited by the second anti-rotator 160 to be described below. In addition, since the nut 140 is provided to be slidably movable on the inner circumferential surface of the rotator 130, displacement may occur in the piston of the master cylinder 20 according to the forward and backward movement of the nut 140.

The nut 140 may be formed in a hollow shape, and provided on the inner circumferential surface thereof with the second screw thread 141 provided as a female thread (or a male thread) meshing with the first screw thread 111 of the lead screw 110. Since the nut 140 and the lead screw 110 are screw-coupled to each other by the first screw thread 111 and the second screw thread 141, the rotational force of the nut 140 rotating together with the rotator 130 may be transmitted to the lead screw 110, generating a translational motion of the lead screw 110 and the input rod 11.

The second anti-rotator 160 may be provided between the rotator 130 and the nut 140 to prevent relative rotation between the rotator 130 and the nut 140. The second anti-rotator 160 may include at least one first plane 161 formed on the inner circumferential surface of the rotator 130 and at least one second plane 162 formed on the outer circumferential surface of the nut 140 and coming in contact with the first plane 161. By a rotational force or power transmitted from the second gear 123, the rotator 130 and the nut 140 are rotated together with each other to transmit the power to the lead screw 110 but are prevented from rotating relative to each other due to the second anti-rotator 160, so that the rotational force or power transmitted from the second gear 123 may be transferred to the lead screw 110 side without loss. In the drawing, the first planes 161 are provided as six first planes 161 on the inner circumferential surface of the rotator 130, and the second planes 162 are provided as six second planes 162 on the outer circumferential surface of the nut 140 to form a hexagonal shape, but the first planes 161 and the second planes 162 may be provided in various numbers and shapes without limitation, as long as they can prevent the relative rotation between the rotator 130 and the nut 140.

The bearing 180 may be interposed between the rotator 130 and the housing 170 to promote smooth rotation of the rotator 130. Specifically, the bearing 180 is interposed between the outer circumferential surface of the rotator 130 and the inner surface of the cover 172 to promote smooth rotation of the rotator 130 and minimize wear and noise between components. The bearing 180 may not only be provided as a ball bearing 180 but also be provided using various structures and methods.

Hereinafter, the operation of the device 100 for moving a brake pedal according to the present embodiment will be described.

FIG. 4 is a side sectional view illustrating a state in which a brake pedal is retracted from a passenger space by the device 100 for moving the brake pedal (an advancing state). Referring to FIG. 4, in a case of autonomous driving of the vehicle or when the brake pedal 10 is desired to be retracted or moved forward (leftward in FIG. 4) at the request of the driver, the electronic control unit transmits an electric signal to rotate the drive shaft 121a of the motor 121 in one direction. The first gear 122 connected to the drive shaft 121a of the motor 121 also rotates in the one direction, and accordingly, the second gear 123, the rotator 130, and the nut 140 also rotate together with each other. The rotational force or power of the nut 140 is transmitted to the lead screw 110 meshed with the nut 140, and the lead screw 110 whose rotation is limited by the first anti-rotator 150 moves forward, so that the input rod 11 and the brake pedal 10 fixed to the lead screw 110 also moves forward, allowing the brake pedal 10 to be retracted from the passenger space of the vehicle.

Hereinafter, an operating state in which the brake pedal 10 is exposed to the passenger space and operated will be described.

FIG. 5 is a side sectional view illustrating a state in which a brake pedal is exposed to a passenger space by the device for moving the brake pedal (a retreating state), and FIG. 6 is a side sectional view illustrating a state in which a brake pedal 10 is manipulated by the driver for braking the vehicle.

Referring to FIG. 5, in a state in which an autonomous driving of the vehicle is not terminated or intervened, when the driver desires to expose or move backward (rightward in FIG. 5) the brake pedal 10 to directly perform driving and braking of the vehicle, the electronic control unit transmits an electrical signal to rotate the drive shaft 121a of the motor 121 in the other direction. The first gear 122 connected to the drive shaft 121a of the motor 121 also rotates in the other direction, and accordingly, the second gear 123, the rotator 130, and the nut 140 also rotate together with each other. The rotational force or power of the nut 140 is transmitted to the lead screw 110 meshing with the nut 140, and the lead screw 110 whose rotation is limited by the first anti-rotator 150 moves backward, so that the input rod 11 and the brake pedal 10 fixed to the lead screw 110 may also move backward, allowing the brake pedal 10 to be exposed to the passenger space of the vehicle.

When the driver desires to brake the vehicle while the brake pedal 10 is exposed to the passenger space of the vehicle, the driver applies a pedaling effort to the brake pedal 10 so that the input rod 11 and the lead screw fixed to the input rod 11 move forward, and the nut 140 screwed to the lead screw 110 also move forward together with the lead screw 10. In this case, since the nut 140 is provided to be slidably movable with respect to the rotator 130, the nut 140 moves forward stably without an influence of the surrounding components, generating displacement in the piston of the master cylinder 20 and implementing braking of the vehicle.

The invention claimed is:

1. An apparatus for moving a brake pedal, the apparatus comprising:
    a lead screw fixed to an input rod of a brake pedal and having a first screw thread formed on an outer circumferential surface thereof;
    a first anti-rotator that prevents the lead screw from rotating;
    an actuator that provides power;
    a rotator rotated by the actuator;
    a nut that rotates together with the rotator and is provided to be slidably movable with respect to the rotator and that has a second screw thread formed on an inner circumferential surface thereof to mesh with the first screw thread; and
    a housing having an accommodation space at an inside thereof;
    wherein the housing includes:
    a panel fixed to a dash panel and having a rear side on which a master cylinder is disposed; and
    a cover that forms the accommodation space and extends toward the brake pedal, to be coupled to a front side of the panel, and
    wherein the first anti-rotator includes:
    an anti-rotation body provided in a cylindrical shape and provided to pass through a through hole that passes through the cover,
    at least one anti-rotation protrusion provided on an outer circumferential surface of the anti-rotation body, and
    at least one anti-rotation groove provided on an inner circumferential surface of the through hole.

2. The apparatus of claim 1, further comprising a second anti-rotator that prevents the rotator and the nut from rotating relative to each other.

3. The apparatus of claim 1, wherein the
    anti-rotation body is fixed to the lead screw, and
    the at least one anti-rotation protrusion protrudes from the anti-rotation body, and
    the at least one anti-rotation groove is recessed in a fixedly installed structure and allowing the at least one anti-rotation protrusion to be inserted thereinto.

4. The apparatus of claim 3, wherein the anti-rotation body includes a body part provided in a cylindrical shape, and
    the at least one anti-rotation protrusion is provided on an outer circumferential surface of the body part.

5. The apparatus of claim 4, wherein the anti-rotation body includes a hollow part formed inside the body part to accommodate at least a portion of the lead screw, and into which the nut is insertable.

6. The apparatus of claim 1, wherein the at least one anti-rotation groove is formed by recessing the cover.

7. The apparatus of claim 1, further comprising
    a bearing interposed between the rotator and the housing.

8. The apparatus of claim 1, wherein the actuator includes:
    a motor that generates power; and
    a gear assembly provided between a drive shaft of the motor and the rotator.

9. The apparatus of claim 8, wherein the motor is disposed on the rear side of the panel.

10. The apparatus of claim 9, wherein the gear assembly is disposed on the front side of the panel and provided in the accommodation space.

11. The apparatus of claim 2, wherein the second anti-rotator includes:
    at least one first plane formed on an inner circumferential surface of the rotator; and
    at least one second plane formed on an outer circumferential surface of the nut to be in contact with the first plane.

12. The apparatus of claim 8, wherein the gear assembly includes:
    a first gear coupled to the drive shaft of the motor; and
    a second gear provided between the first gear and the rotator to transmit power transmitted from the first gear to the rotator.

13. The apparatus of claim 12, wherein the first gear is provided with first gear teeth on an outer circumferential surface thereof, and
    the second gear is provided with second gear teeth meshing with the first gear teeth on an outer circumferential surface thereof.

14. The apparatus of claim 12, wherein a rotation shaft of the first gear and a rotation shaft of the second gear are arranged in parallel to each other.

15. The apparatus of claim 1, wherein the housing further includes a fixing pin that couples the panel and the cover to each other and allows the housing to be supported on a vehicle body.

16. The apparatus of claim 1, wherein the nut is provided to be in contact with a piston of the master cylinder.

17. The apparatus of claim 5, wherein the first anti-rotator further includes a fastening part fixed to the lead screw.

18. The apparatus of claim 1, wherein the actuator is controlled to automatically operate by an electronic control unit of a vehicle, or controlled to operate by receiving an operation signal from a driver.

* * * * *